US009374983B1

(12) United States Patent
Kuehr et al.

(10) Patent No.: US 9,374,983 B1
(45) Date of Patent: Jun. 28, 2016

(54) CANINE CLOTHING ARTICLE FOR INCLEMENT WEATHER

(71) Applicant: Bijan's Protective Equipment, Inc., Santa Rosa, CA (US)

(72) Inventors: Steffen Oliver Kuehr, San Rafael, CA (US); Fereshteh Kia Bijan, San Rafael, CA (US)

(73) Assignee: Bijan's Protective Equipment, Inc., Santa Rosa, CA (US)

( * ) Notice: Subject to any disclaimer, the term of this patent is extended or adjusted under 35 U.S.C. 154(b) by 0 days.

(21) Appl. No.: 14/285,250

(22) Filed: May 22, 2014

Related U.S. Application Data

(60) Provisional application No. 61/826,641, filed on May 23, 2013.

(51) Int. Cl.
*A01K 13/00* (2006.01)
(52) U.S. Cl.
CPC .................................. *A01K 13/006* (2013.01)
(58) Field of Classification Search
CPC ............................ A01K 13/006; A01K 13/008
USPC ................. 119/850, 856, 858, 859, 863, 865;
54/79.1, 79.2, 79.3, 79.4, 80.1
See application file for complete search history.

(56) References Cited

U.S. PATENT DOCUMENTS

| D142,815 | S | * | 11/1945 | Ardmore | D30/145 |
| 3,150,641 | A | * | 9/1964 | Kesh | 119/678 |
| 3,742,679 | A | * | 7/1973 | Jordan | 54/79.1 |
| 3,918,238 | A | * | 11/1975 | Iozzio | 54/79.2 |
| 5,996,537 | A | * | 12/1999 | Caditz | 119/850 |
| 6,058,890 | A | * | 5/2000 | Harrell | 119/850 |
| 8,413,670 | B1 | * | 4/2013 | Richardson, Jr. | 135/16 |
| 2004/0134447 | A1 | * | 7/2004 | Seymour | 119/850 |
| 2009/0025119 | A1 | * | 1/2009 | Nespor | 2/84 |
| 2009/0308330 | A1 | * | 12/2009 | Kajanoff | 119/850 |
| 2010/0115895 | A1 | * | 5/2010 | Prill | 54/79.2 |
| 2010/0206247 | A1 | * | 8/2010 | Cheng et al. | 119/850 |
| 2014/0224189 | A1 | * | 8/2014 | Hamilton et al. | 119/855 |

* cited by examiner

*Primary Examiner* — Trinh Nguyen
(74) *Attorney, Agent, or Firm* — Bay Area Technology Law Group PC

(57) ABSTRACT

A clothing article for a dog. The article includes a torso cover extending between the neckline and tail line of the dog and having a width defined by its lateral edges sized to drape over the dog's torso covering at least a portion of it. A belly strap is included extending between the lateral edges and when combined with extenders facilitate the removable attachment of the clothing article to the dog. A hood completes the clothing article which includes a structural frame and webbing for selective attachment to the torso cover, the hood being shaped and sized such that when worn by a dog, it selectively resides above the dog's head without significantly deforming the dog's ears and without significantly obstructing the dog's vision.

9 Claims, 3 Drawing Sheets

CANINE CLOTHING ARTICLE FOR INCLEMENT WEATHER

TECHNICAL FIELD

The present invention is directed to a clothing article, ideally a hooded raincoat for use by a dog. Uniquely, the clothing article includes a hood which is sized to selectively reside over the dog's head without deforming the dog's ears and without obstructing the dog's vision.

BACKGROUND OF THE INVENTION

Although dogs can withstand a wide variety of environmental conditions, dog owners often find it desirable to protect their pets with various forms of outer wear. Pet owners might do so as a fashion statement while others opt to protect their pets from harsh environmental conditions.

Clothing a pet dog with a garment which is water resistant can result in a number of significant advantages. Not only is water resistant clothing apt to reduce illness, but when the pet returns indoors, a relatively dry coat would reduce the broadcast of water droplets as the dog shakes to dry itself.

If one was to seek a clothing product which would not only act as an insulator to reduce body heat from the animal's torso but also to protect it from precipitation, a hood would generally be felt to be necessary. However, most dogs are quite resistant to a hooded clothing product, and for good reason. Hoods of the prior art tend to fit directly onto the dog's head, thus deforming the dog's ears and blocking its vision by slipping over the dog's eyes. Also, sometimes the hood slips back from the dog's head leaving the dog exposed to the elements. Not surprisingly, dogs will instinctively try to rid themselves of such a hooded article thus making such clothing product undesirable as a means to cover the dog's head in inclement weather.

It is the object of the present invention to provide a clothing article for a dog which overcomes the various limitations noted above.

It is yet a further object of the present invention to provide a hooded, water resistant clothing article which will not deform a dog's ears or obstruct its vision and thus will reduce or completely eliminate any resistance which a dog would otherwise direct towards it.

These and further objects will be readily apparent when considering the following disclosure and appended claims.

SUMMARY OF THE INVENTION

A clothing article for a dog, said dog having a head, ears extending therefrom, a torso, a neckline as the neck transitions to the torso, a tail and a tail line located as the torso transitions to said tail, a torso cover having a length sized to extend substantially at a first edge proximate said neckline to a second edge proximate said tail line and a width defined by lateral edges sized to drape over said torso covering at least a portion thereof, a belly strap when used extending between said lateral edges and across an underside of said torso, a pair of extenders emanating at said first edge and sized to selectively attach to one another, said extenders and belly strap in combination facilitating the removable attachment of said clothing article to said dog, a hood comprising a structural frame and webbing applied to said structural frame and selectively attached to said first edge of said torso cover, said hood being shaped and sized such that when worn by said dog, the rain hood selectively resides above the dog's head without substantially deforming the dog's ears and without substantially obstructing the dog's vision.

DETAILED DESCRIPTION OF THE INVENTION

Figure 1:
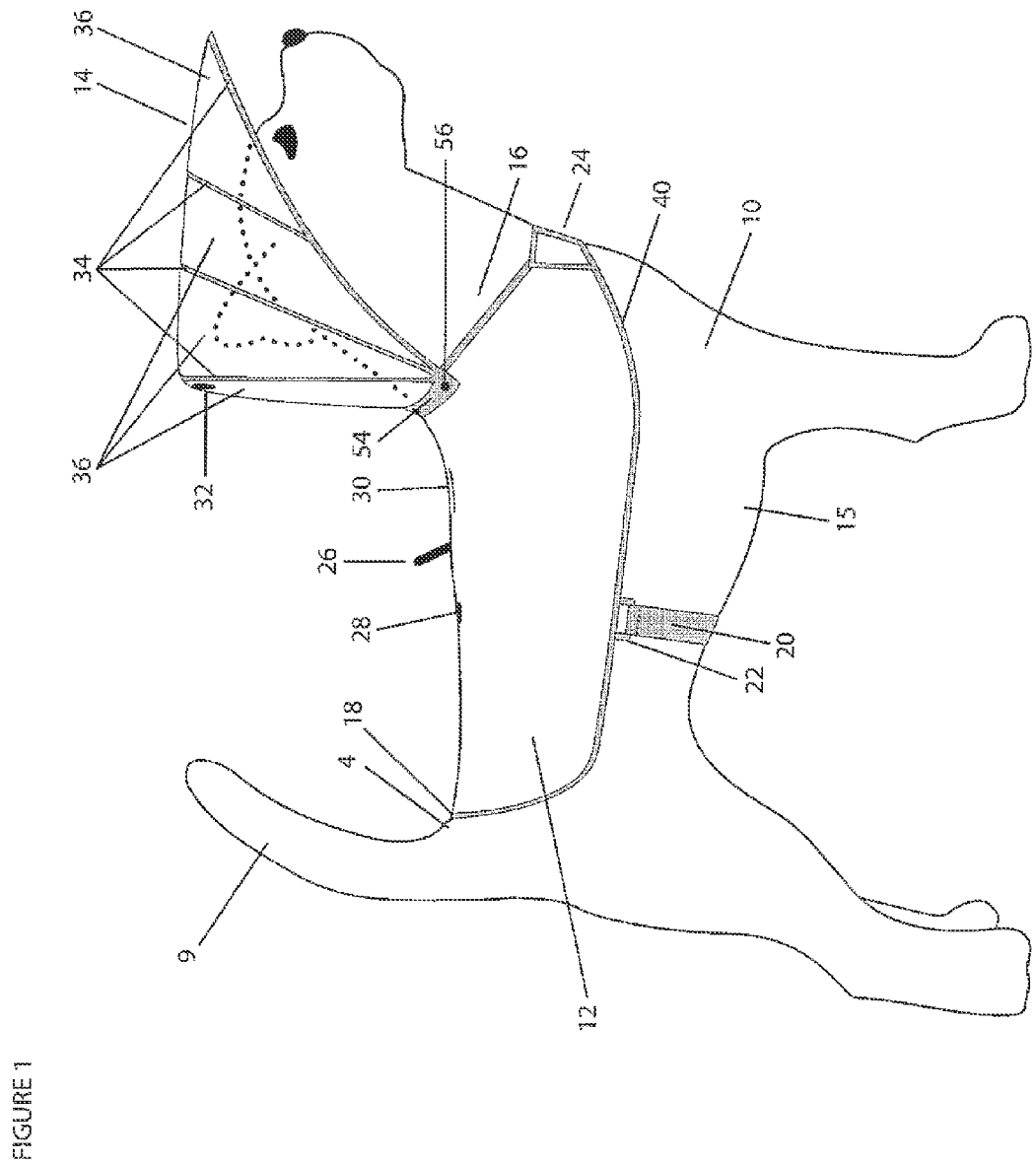
FIG. 1 is a side view of a dog wearing the clothing article of the present invention with its hood portion in a first orientation.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning to the three appended figures, dog 10 is illustrated as wearing the clothing article of the present invention. Dog 10 is illustrated as having head 1, ears 2 extending therefrom, torso 15, neckline 3 located as the neck transitions to the torso, tail 9 and tail line 4 located as the torso transitions to tail 9.

Figure 2:
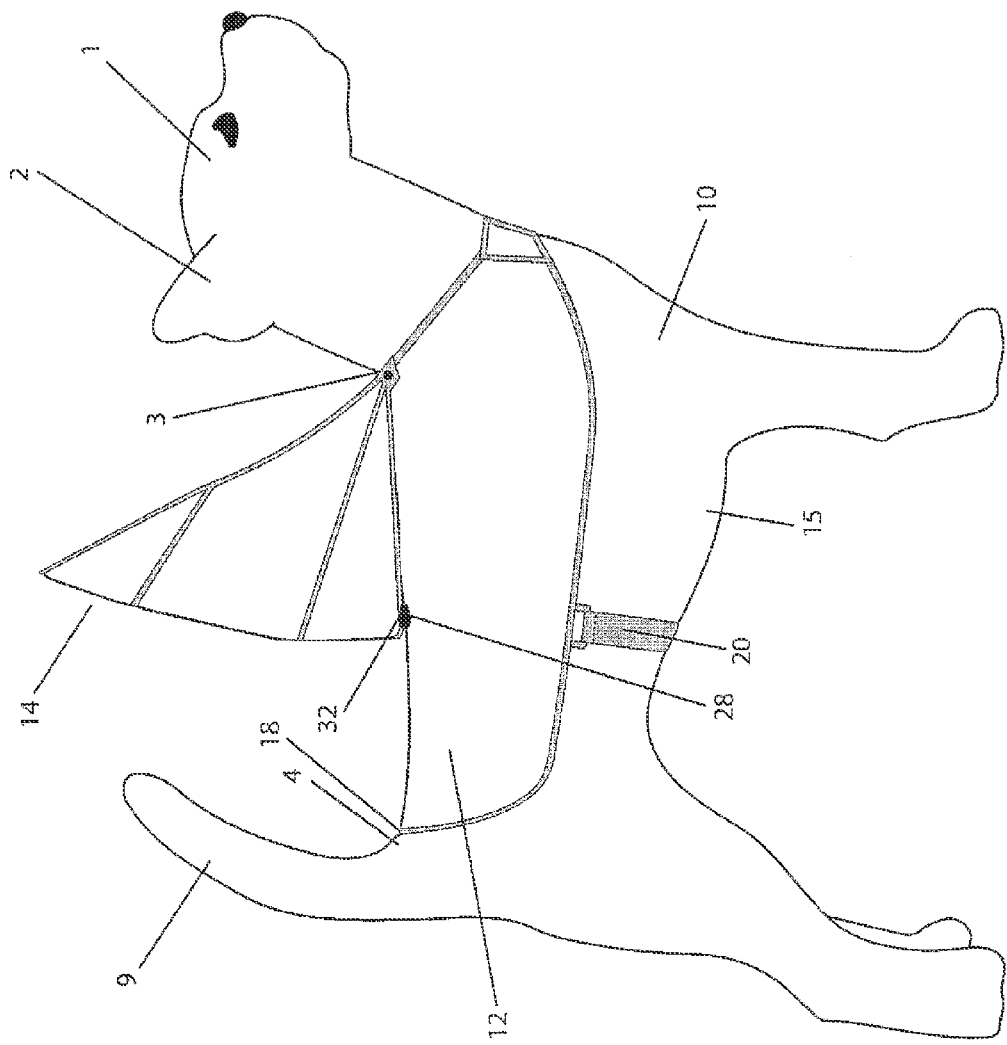
FIG. 2 is a side view of a dog wearing the clothing article of the present invention with the hood portion in a second orientation.

The present clothing article includes a torso cover 12 having a length sized to extend substantially proximate first edge 8 from neckline 3 to a second edge 18 proximate tail line 4 and a width defined by lateral edges 5 and 6 which, as noted in reference to FIGS. 1 and 2, drape over torso 15 covering at least a portion thereof. Belly strap 20 is employed to maintain torso cover 12 in place as shown in FIGS. 1 and 2. Belly strap 20, in use, extends between lateral edges 5 and 6 and across the underside of torso 15. Loop 22 can reside and extend from lateral edge 6 while belly strap 20 emanates from lateral edge 5. In extending across the underbelly of torso 15, belly strap 20 slides within loop 22 and overlaps onto itself to enable hook and loop sections 48 and 50 to releasably attach to one another. In using hook and loop fasteners 48 and 50, belly strap 20 is adjustable to accommodate dogs of varying girth.

Figure 3:
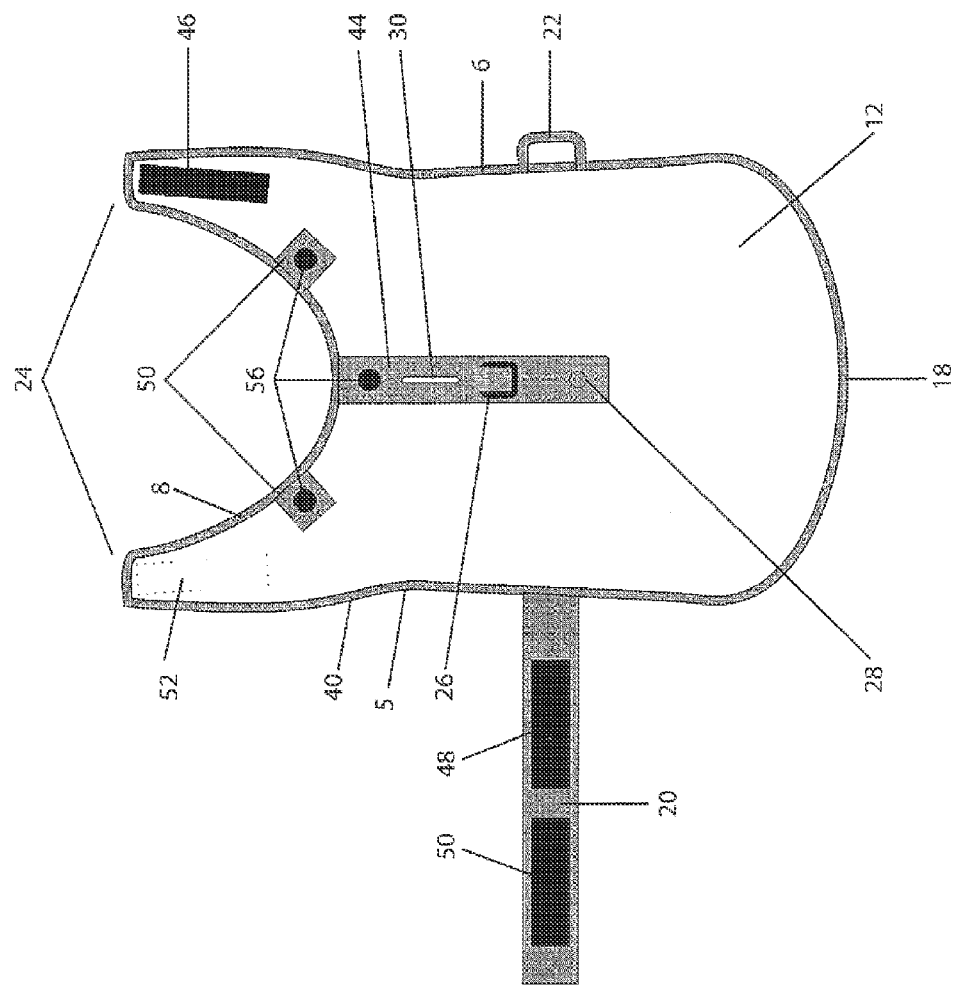
FIG. 3 is a plain view of the torso portion of the clothing article of the present invention.

As best seen in reference to FIG. 3, a pair of extenders 24 emanate from first edge 8 and are sized to selectively attach to one another by virtue of hook and loop fasteners 46 and 52 about the chest region of torso 15. As is quite apparent in viewing FIGS. 1 and 2, extenders 24 used in conjunction with belly strap 20 facilitate the removable attachment of the present clothing article to a dog.

The present clothing article includes hood 14 comprised of structural frame members 34 in the form of metal or plastic rods or tubes which, though can be bendable, are resistant to deformation thus maintaining the shape of hood 14 as shown. Structural frame members 34 act to support webbing 36 preventing webbing 36 from draping over head 1 as is common in hooded clothing articles of the prior art. By contrast, hood 14 is shaped and sized such that when worn by dog 10, hood 14 selectively resides above head 1 without substantially deforming ears 2 and without substantially obstructing the dog's vision. In so structuring and positioning hood 14, dog 10 would be much less apt to resist the wearing of the present clothing article and, thus, the present invention represents a much more useable product than that of the prior art.

As a preferred embodiment, hood 14 is selectively removable from torso cover 12. This can be accomplished in a number of ways by either employing buttons 56 and corresponding button sockets (not shown), the buttons being applied to base 54 of hood 14 and to designated areas 50 on the torso cover 12 although any common method of attachment can be alternatively employed such as through the use of hook and loop fasteners, zippers, and the like.

As a further preferred embodiment, and particularly when the present clothing article is made to act as a raincoat-type wearable article, webbing 36 of hood 14 is to be transparent. Many forms of transparent sheeting can be employed in conjunction with frame members 34 for this purpose. In making webbing 35 transparent, in the event that hood 14 slips to a position at or below the dog's eyes, dog 10 will generally not find hood 14 objectionable as the dog's vision will not be significantly impaired.

As yet a further preferred embodiment, first and second connectors 32 and 28 are provided, first connector 32 being positioned on webbing 36 as shown while second connector 28 is positioned on torso cover 12. The first and second connectors 32 and 28 are positioned for selectively repositioning hood 14 to torso cover 12 thus removing hood 14 from residing above head region 1. Thus, if the present clothing article is employed as raingear, when inclement weather subsides, one need only move hood 14 from its covering position of FIG. 1 to its stowed position of FIG. 2 while torso cover 12 is maintained on and about torso 15 of dog 10. Ideally, first and second connectors 32 and 28 can comprise magnets as there is little resistance in maintaining hood 14 atop torso cover 12 when not in use.

It is yet a further preferred embodiment, torso portion 12 of the present clothing article can be provided with webbing strap 44 (FIG. 3) generally located equally distant between lateral edges 5 and 6. Webbing strap 44 can also be employed to support loop 26 which can be used to act as an anchor for a dog leash that the pet owner might wish to attach to torso portion 12. Alternatively, button hole opening 30 can be provided if dog 10 is first fitted with a harness enabling a leash to pass within button hole 30 in order to connect the leash to the harness. Clearly, webbing strap 44 provides enhanced durability in that region which a pet owner might wish to use in attaching a leash in order to enhance the overall durability of the subject clothing product.

As is quite apparent, the present clothing article can be employed as a rain poncho with a sturdy rain hood which can be selectively applied to head 1 of dog 10 as needed. Torso portion 12 can simply consist of a water repellent fabric or could be lined with a soft and warm fabric such as fleece in regions where extreme cold conditions are at issue. If a lining is employed, the lining and waterproof outer fabric can be sewn or otherwise bound by tape and the like forming trim 40. In either case, what is now provided is a clothing article which can fit and be retained on dogs of various sizes composed of lined or unlined sheeting with a removable or repositionable rain hood which is configured with webbing and frame members so as to reside above head region 1 without significantly deforming ears 2 and without significantly obstructing the dog's vision. Such a clothing article is likely to be much more easily accepted by dog 10 than competitive clothing articles of prior art.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A clothing article for a dog, said dog having a head, ears extending therefrom, a torso, a neckline as the neck transitions to the torso, a tail and a tail line located as the torso transitions to said tail, a torso cover having a length sized to extend substantially at a first edge proximate said neckline to a second edge proximate said tail line and a width defined by lateral edges sized to drape over said torso covering at least a portion thereof, a belly strap when used extending between said lateral edges and across an underside of said torso, a pair of extenders emanating at said first edge and sized to selectively attach to one another, said extenders and belly strap in combination facilitating the removable attachment of said clothing article to said dog, a sturdy hood comprising a structural frame of flexible non deformable rods to provide sturdiness and shape and water resistant fabric or similar material applied to said structural frame and wherein said hood can selectively be either (a) attached to said front edge of said torso cover, said hood being shaped and sized such that when worn by said dog, the hood selectively resides above the dog's head without substantially deforming the dog's ears and without substantially obstructing the dog's vision while protecting the top of said dog's head as well as the sides of said dog's face from inclement weather, or where said hood can be (b) folded back to engage said torso cover to a stowed position while the torso is maintained on, or (c) where said hood can be removed completely from the torso cover.

2. The clothing article of claim 1 wherein said hood is detachable from said torso cover.

3. The clothing article of claim 1 wherein said hood and torso cover are provided with buttons for facilitating the detachable connection of said hood to said torso cover.

4. The clothing article of claim 1 wherein said water resistant fabric or similar material on top of the hood and along the sides of the hood is transparent.

5. The clothing article of claim 1 further comprising first and second connectors, said first connector being a magnet sewn into said water resistant fabric or similar material on the back of said hood and said second connector being a magnet sewn into a webbing strip in the center of said torso cover for selectively repositioning said hood from residing above the dog's head to being folded back from above said dog's head when said first and second connectors are attached to one another.

6. The clothing article of claim 1 further comprising a loop affixed to said torso cover for attachment of a leash thereto.

7. The clothing article of claim 1 further comprising an opening configured within said torso cover for facilitating passage of a leash through said torso cover.

8. The clothing article of claim 1 wherein said belly strap comprises first and second ends, first end of which is affixed to one of said lateral edges of said torso cover.

9. The clothing article of claim 8 wherein a loop is affixed to a second edge of said torso cover, said belly strap being sized to pass through said loop for securing said torso cover to the torso of a dog.

\* \* \* \* \*